United States Patent
Jain et al.

(10) Patent No.: US 11,605,079 B2
(45) Date of Patent: Mar. 14, 2023

(54) METHOD, APPARATUS AND COMPUTER PROGRAM FOR TRANSACTION DESTINATION VERIFICATION

(71) Applicant: VOCALINK LIMITED, London (GB)

(72) Inventors: Ashish Jain, Gurgaon (IN); Bhupinder Singh Narang, Gurgaon (IN); Pulkit Gupta, New Delhi (IN); Michael Alan Dewar, Surrey (GB); Jeremy Robert Stephens, Hertfordshire (GB)

(73) Assignee: VOCALINK LIMITED, London (GB)

( * ) Notice: Subject to any disclaimer, the term of this patent is extended or adjusted under 35 U.S.C. 154(b) by 179 days.

(21) Appl. No.: 16/825,076

(22) Filed: Mar. 20, 2020

(65) Prior Publication Data
US 2020/0311728 A1    Oct. 1, 2020

(30) Foreign Application Priority Data

Mar. 29, 2019 (EP) ..................... 19166252

(51) Int. Cl.
*G06Q 20/00*    (2012.01)
*G06Q 20/40*    (2012.01)
*G06F 16/23*    (2019.01)
*G06Q 20/10*    (2012.01)

(52) U.S. Cl.
CPC ....... *G06Q 20/401* (2013.01); *G06F 16/2379* (2019.01); *G06Q 20/10* (2013.01)

(58) Field of Classification Search
CPC .. G06Q 20/4016; G06Q 20/10; G06Q 20/401; G06F 16/2379
See application file for complete search history.

(56) References Cited

U.S. PATENT DOCUMENTS

| | | | | |
|---|---|---|---|---|
| 8,783,564 | B2 * | 7/2014 | Calabrese | G06Q 40/00 235/382 |
| 2002/0073019 | A1 * | 6/2002 | Deaton | G06Q 20/042 705/38 |
| 2011/0191247 | A1 * | 8/2011 | Dominguez | G06Q 20/10 705/64 |
| 2014/0344140 | A1 * | 11/2014 | Kosloski | G06Q 20/10 705/39 |
| 2017/0316388 | A1 | 11/2017 | Iyer et al. | |

FOREIGN PATENT DOCUMENTS

| | | | | |
|---|---|---|---|---|
| AU | 2003261471 | A * | 12/2003 | ......... G06Q 20/4016 |
| JP | 6404979 | B1 * | 10/2018 | |

* cited by examiner

*Primary Examiner* — Scott S Trotter
(74) *Attorney, Agent, or Firm* — Harness, Dickey & Pierce, P.L.C.

(57) ABSTRACT

A method of verifying the destination of a transaction between nodes in a network includes receiving transaction information corresponding to a transaction between the nodes, where the transaction information comprises a unique destination identifier and a destination name and where the unique destination identifier defines a destination account of the transaction; obtaining from a storage unit a set of names used in previous transactions to that destination account; determining at least one disparity value between the destination name and the set of names; and producing a destination verification value based on the at least one disparity value, wherein the destination verification value is used to verify whether the transaction between nodes should proceed.

12 Claims, 4 Drawing Sheets

| Name | Number | Time | Value | Flag |
|------|--------|------|-------|------|
| X | | | | |
| Y | | | | |
| Z | | | | |

502 — Name; 504 — Number; 506 — Time; 508 — Value; 510 — Flag; 500

FIG. 5

METHOD, APPARATUS AND COMPUTER PROGRAM FOR TRANSACTION DESTINATION VERIFICATION

CROSS-REFERENCE TO RELATED APPLICATION

This application claims the benefit of, and priority to, pending European Patent Application No. 19166252.7 filed on Mar. 29, 2019. The entire disclosure of the above application is incorporated herein by reference.

FIELD

The present disclosure relates to a method, apparatus and computer program for transaction destination verification.

BACKGROUND

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

In recent years, there has been a significant increase in the number and frequency of electronic transactions, and in particular, the number and frequency of electronic transactions made by individuals. With such an increase there is, inevitably, an increase in the potential for the electronic payments to be misdirected. In particular, misdirected transactions are an inherent problem in electronic payment systems. Often, even a single digit incorrectly entered in the transaction information will result in the transaction being misdirected. Incorrect transaction information regarding an electronic payment may originate through a genuine mistake by the user, or may be the result of impersonation or fraudulent attacks.

A misdirected electronic transaction may therefore be received by an unintended recipient, or alternatively, may not be received by anyone at all.

The consequences related to the misdirection of electronic transactions and their associated information can be high. For example, sensitive information is often provided with electronic transactions and, if the electronic transaction is misdirected, this sensitive information may be provided to an unintended recipient, compromising the security of the information. Additionally, it is often necessary that an electronic transaction is received by a certain time, and the misdirection of electronic transactions can lead to significant delays in the electronic transaction reaching the intended recipient.

In the case of electronic transactions being made via portable devices, the number of misdirected electronic transactions may be particularly high. For example, portable devices often have small display screens, and this limited display space available for displaying transaction information can lead to mistakes in the transaction information going unnoticed by the user. Additionally, users often perform these transactions while performing other tasks, resulting in a lack of concentration when providing the transaction information. This lack of concentration by the user can also increase the likelihood of a mistake in the transaction information going unnoticed by the user, and the likelihood of a subsequent misdirected transaction being made.

Once the misdirected transaction has been made it can be difficult to retrieve, and certain consequences of such misdirected transactions are difficult to alleviate. This can cause increased frustration for the user.

In particular, there may be additional difficulties in retrieving the funds associated with a misdirected electronic payment, since the user will often have provided authentication or confirmation indicating they wished the transaction to proceed. Furthermore, the delay in recovering the transaction and associated funds following a misdirected electronic payment may also prove particularly problematic in the case of fraudulent attacks, since the perpetrators of the fraud typically disperse funds through the banking network at high speed such that the funds may be difficult to recover.

As such, a misdirected electronic payment can result in financial loss for the user, the intended recipient of the payment, or a financial institution associated with the user.

It is an aim of the present disclosure to address these issues.

SUMMARY

This section provides a general summary of the disclosure, and is not a comprehensive disclosure of its full scope or all of its features. Aspects and embodiments of the disclosure are set out in the accompanying claims.

According to embodiments of the disclosure, a method of a transaction between nodes in a network is provided, the method comprising receiving transaction information corresponding to a transaction between the nodes, the transaction information comprising a unique destination identifier and a destination name, the unique destination identifier defining a destination account of the transaction; obtaining from a storage unit a set of names used in previous transactions to that destination account; determining at least one disparity value between the destination name and the set of names; and producing a destination verification value based on the at least one disparity value, wherein the destination verification value is used to verify whether the transaction between nodes should proceed.

According to embodiments of the disclosure, an apparatus for verifying the destination of a transaction between nodes in a network is provided, the apparatus comprising at least one processing circuitry configured to receive transaction information corresponding to a transaction between the nodes, the transaction information comprising a unique destination identifier and a destination name, the unique destination identifier defining a destination account of the transaction; obtain from a storage unit a set of names used in previous transactions to that destination account; determine at least one disparity value between the destination name and the set of names; and produce a destination verification value based on the at least one disparity value, wherein the destination verification value is used to verify whether the transaction between nodes should proceed.

According to embodiments of the disclosure, a computer program product comprising instructions which, when the program is executed by the computer, cause the computer to carry out a method of verifying the destination of a transaction between nodes in a network is provided, the method comprising receiving transaction information corresponding to a transaction between the nodes, the transaction information comprising a unique destination identifier and a destination name, the unique destination identifier defining a destination account of the transaction; obtaining from a storage unit a set of names used in previous transactions to that destination account; determining at least one disparity value between the destination name and the set of names; and producing a destination verification value based on the at least one disparity value, wherein the destination verification value is used to verify whether the transaction between nodes should proceed.

According to embodiments of the present disclosure, it is possible to verify the destination of a transaction between nodes in a network in substantially real time, resulting in a reduction in the number of misdirected transactions thus improving the security of the electronic transactions.

The foregoing paragraphs have been provided by way of general introduction, and are not intended to limit the scope of the following claims. The described embodiments, together with further advantages, will be best understood by reference to the following detailed description taken in conjunction with the accompanying drawings.

DRAWINGS

The drawings described herein are for illustrative purposes only of selected embodiments and not all possible implementations, and are not intended to limit the scope of the present disclosure. In connection therewith, a more complete appreciation of the disclosure and many of the attendant advantages thereof will be readily obtained as the same becomes better understood by reference to the following detailed description when considered in connection with the accompanying drawings, wherein:

FIG. 5 depicts a set of names which have been used in previous transactions associated with an account in accordance with embodiments of the disclosure.

DESCRIPTION

Figure 1:
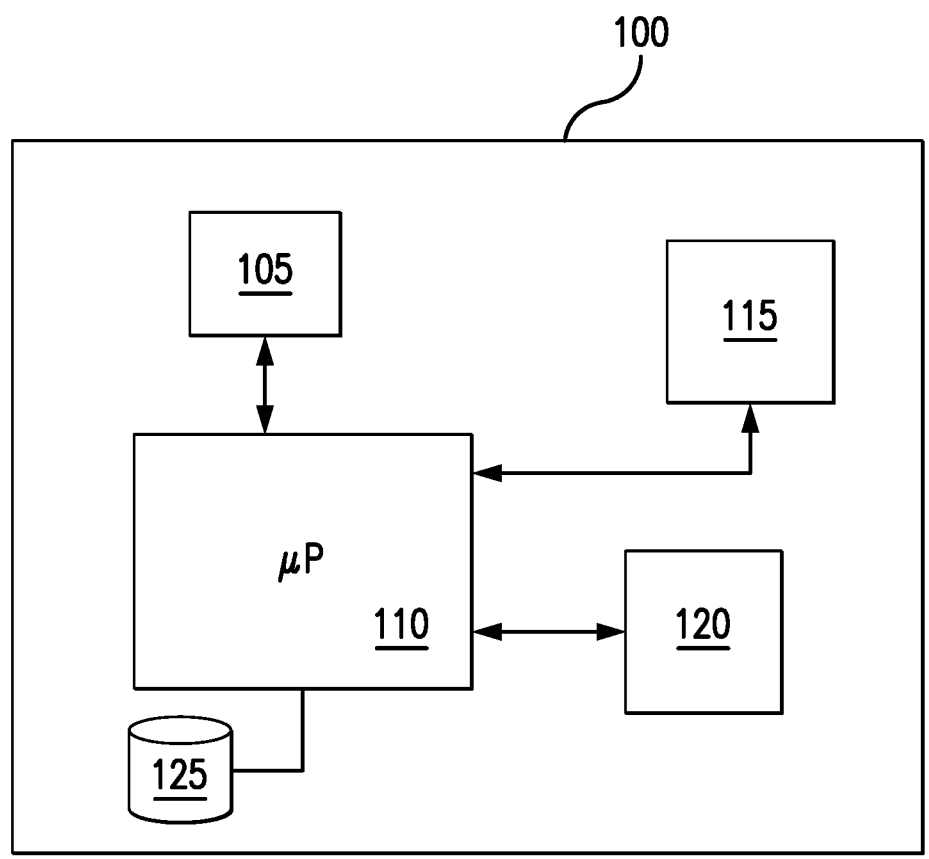
FIG. 1 shows an apparatus according to embodiments of the disclosure.

Embodiments will be described, by way of example only, with reference to the drawings. The description and specific examples included herein are intended for purposes of illustration only and are not intended to limit the scope of the present disclosure. Referring now to the drawings, wherein like reference numerals designate identical or corresponding parts throughout the several views.

Referring to FIG. 1, an apparatus 100 according to embodiments of the disclosure is shown. Typically, an apparatus 100 according to embodiments of the disclosure is a computer device such as a personal computer or a terminal connected to a server. Indeed, in embodiments, the apparatus may also be a server. The apparatus 100 is controlled using a microprocessor or other processing circuitry 110.

The processing circuitry 110 may be a microprocessor carrying out computer instructions or may be an Application Specific Integrated Circuit. The computer instructions are stored on storage medium 125 which may be a magnetically readable medium, optically readable medium or solid state type circuitry. The storage medium 125 may be integrated into the apparatus 100 or may be separate to the apparatus 100 and connected thereto using either a wired or wireless connection. The computer instructions may be embodied as computer software that contains computer readable code which, when loaded onto the processor circuitry 110, configures the processor circuitry 110 to perform a method according to embodiments of the disclosure.

Additionally connected to the processor circuitry 110, is a user input 105. The user input may be a touch screen or may be a mouse or stylist type input device. The user input 105 may also be a keyboard or any combination of these devices.

A network connection 115 is also coupled to the processor circuitry 110. The network connection 115 may be a connection to a Local Area Network or a Wide Area Network, such as the Internet or a Virtual Private Network, or the like. For example, the network connection 115 may be connected to a banking infrastructure allowing the processor circuitry 110 to communicate with other banking institutions to obtain relevant data or provide relevant data to the institutions. The network connection 115 may therefore be behind a firewall or some other form of network security.

Additionally coupled to the processing circuitry 110, is a display device 120. The display device 120, although shown integrated into the apparatus 100, may additionally be separate to the apparatus 100 and may be a monitor or some kind of device allowing the user to visualize the operation of the system. In addition, the display device 120 may be a printer or some other device allowing relevant information generated by the apparatus 100 to be viewed by the user or by a third party.

Exemplary Application of Destination Verification:

As noted above, it is desirable to reduce the number of misdirected electronic transactions which occur between nodes in a network. Accordingly, a method of verifying the destination of a transaction between nodes in a network is provided. Embodiments of the present disclosure can be applied to electronic payments made between users in a payments network, for example.

Figure 2:
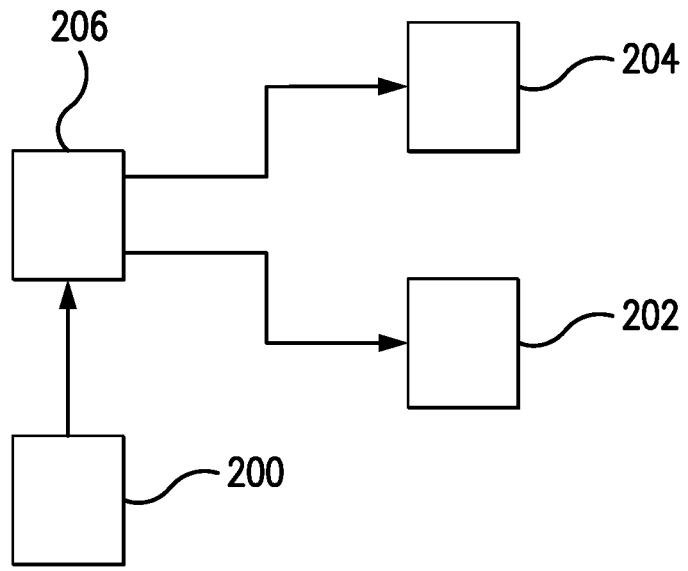
FIG. 2 depicts an exemplary transaction between users in a network according to embodiments of the disclosure.

FIG. 2 illustrates an exemplary payment according to embodiments of the disclosure. Users 200, 202 and 204 are owners of accounts in the payments network. These account owned by users 200, 202 and 204 are registered to financial institution 206. While in this example all accounts are registered at the same financial institution 206, embodiments of the disclosure could be applied to accounts registered at separate financial institutions in the payments network.

In this example, user 200 wishes to transfer funds to user 202 through a form of electronic payment such as a Faster Payment, or the like. User 200 instructs a payment to user 202 by providing a unique destination identifier which identifies the account of user 202. In this example, the unique destination identifier could be the account number of the account owned by user 202, the account number and sort code of the account owned by user 202, or the like. According to embodiments of the disclosure, user 200 must also provide a destination name in the transaction information. In this example, the destination name could be the name of user 202 who owns the account to which user 200 wishes the electronic payment to be made. In this example, user 200 will also provide information, such as a transaction amount, the transaction amount indicating a value of the funds which are to be transferred during the electronic payment. In this example, user 200 may supply the transaction information on an electronic terminal or device, such as a mobile phone, tablet or personal computer, or the like.

Once user 200 has provided the relevant transaction information as described above, the transaction request is sent to financial institution 206. The financial institution 206 will then process the transaction request and perform the payment from the account owned by user 200 to the account owned by user 202. However, according to embodiments of the disclosure, financial institution 206 will first perform a method of verifying the destination of the transaction before the transaction between user 200 and user 202 is processed.

In this example, financial institution 206 has access to a set of previous destination names which have been used in previous transactions to user 202. The set of previous names may be stored at financial institution 206 or, alternatively, may be stored at a separate location in the payments network. Such an alternative location may be a separate financial institution, a central storage location, or the like.

Accordingly, upon receiving the transaction request from user 200, the financial institution 206 will use the received unique destination identifier (such as the account number) in order to retrieve the set of previous names which are associated with that destination account. Once this set of previous names has been retrieved, the financial institution 206 will compare the destination name provided by user 200 with this set of previous names. According to embodiments of the disclosure, the level of disparity or variation between the destination name provided by user 200 and the set of previous names which have been used in previous transactions associated with user 200 will be used in order to verify whether the transaction between user 200 and user 202 should proceed.

It will be appreciated that in known electronic payments, the unique destination identifier alone is used in order to determine the destination account. Any destination name which is provided is used only for reference or accounting purposes. That is, in known electronic payments, the user may provide any destination name which they desire, or may provide no destination name at all. In other words, in known electronic payments, if the unique destination identifier exists then the electronic payment will occur, even if no destination name or an inappropriate destination name is provided.

In contrast, according to embodiments of the disclosure, while the unique destination identifier is used in order to identify the account to which the user intends to make the electronic payment, the destination name is itself compared against the set of names used in previous transactions to that destination account in order to provide a method of destination verification and thus reduce the number of erroneously misdirected electronic payments occurring due to mistakes in the unique destination identifier.

Consider a first situation whereby user 200 does not make a mistake when providing the transaction information to financial institution 206. In this situation, the destination name provided by user 200 will be compared against the set of names used in previous transactions to the account owned by user 202 (since user 200 has correctly entered the unique destination identifier of user 202). Since the destination name provided by user 200 is compared against the name or names used in previous transactions to user 202, the level of disparity or variation between the names will be low. Owing to the low level of disparity, financial institution 206 will determine that the destination of the transaction has been verified and will proceed with the transaction from user 200 to user 202.

However, consider a second exemplary situation whereby user 200 makes a mistake when providing the unique destination identifier in the transaction information, and has mistakenly provided the unique destination identifier associated with user 204. Such a mistake may occur owing to a genuine mistake by user 200 when providing the information (arising from a lack of concentration, or the like) or may instead arise owing to an attempt to fraudulently misdirect the electronic payment to the account of user 204. In this situation, the financial institution 206 will retrieve the set of names used in previous transactions to user 204. Thus, when the destination name provided by user 200, who intended to make the payment to user 202, is compared against the set of names used in previous transactions to user 204, a high level of disparity will be determined.

According to embodiments of the disclosure, it may be determined, owing to the high level of disparity between the set of previous names and the destination name provided by user 200, that the transaction should not proceed. In this manner, the misdirection of the electronic payment to user 204 can be prevented.

In contrast, consider the exemplary situation whereby user 200 does not make a mistake when providing the unique destination identifier but instead makes a small mistake in the spelling of the name of user 202 when providing the transaction information. In this case, the name provided by user 200 will be compared against the set of names used in previous transactions associated with the account owned by user 202. In this situation, while user 200 has made a small mistake in the spelling of the name of user 202, since the destination name is compared against the set of names used in previous transactions to the account owned by user 202, the overall level of disparity which is determined will still be low. As such, although user 200 has made a small mistake in the spelling of the name of user 202, the transaction destination itself can still be verified.

That is, the method of destination verification according to embodiments of the disclosure does not depend upon an absolute match between the destination name and the name of user 202. Rather, the destination name is compared against the set of names used in previous transactions associated with user 202, resulting in increased flexibility and reliability of the method of transaction verification according to embodiments of the disclosure.

As such, even in this third exemplary situation where user 200 makes a small mistake when providing the destination name in the transaction information, the transaction between the accounts of user 200 and 202 will proceed. Accordingly even whereby the transaction information is provided by a user using a portable electronic terminal or device with small a screen display, such as a mobile phone, tablet, personal computer or the like, a reduction in misdirected transactions can be attained.

In other words, by determining the level of disparity or variation between the name provided by user 200 and the set of names used in previous transactions associated with the unique destination identifier as according to embodiments of the disclosure it is possible to verify the destination of a transaction between nodes in a network in substantially real time, resulting in a reduction in the number of misdirected electronic transactions.

Figure 3:
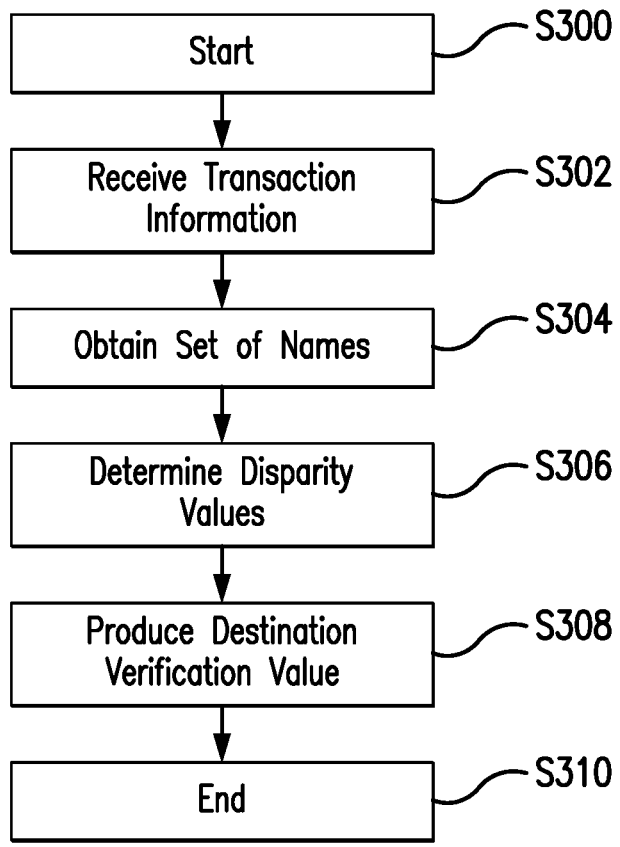
FIG. 3 illustrates a method of verifying the destination of a transaction between nodes in a network according to embodiments of the disclosure.

Method of Destination Verification:

FIG. 3 illustrates a method of verifying the destination of a transaction between nodes in a network according to embodiments of the disclosure. Step S302 comprises receiving transaction information corresponding to a transaction between the nodes, the transaction information comprising a unique destination identifier and a destination name, the unique destination identifier defining a destination account of the transaction. Step S304 comprises obtaining from a storage unit a set of names used in previous transactions to that destination account. Step S306 comprises determining at least one disparity value between the destination name and the set of names. Finally, step S308 comprises producing a destination verification value based on the at least one disparity value, wherein the destination verification value is used to verify whether the transaction between nodes should proceed.

The method steps S302 to S308 are described in detail below, with reference to the example illustrated in FIG. 2.

As described above, step S302 comprises receiving transaction information corresponding to a transaction between nodes, the transaction information comprising a unique destination identifier and a destination name, the unique destination identifier defining a destination account of the transaction. That is, according to embodiments of the disclosure, the received transaction information comprises a unique identifier $\alpha$ identifying the intended destination of the transaction, and a destination name M denoting the name of the destination account, where:

$$M \in \Omega$$

and $\Omega$ represents all possible names which could be assigned to destination name M by the initiator of the transaction. In other words, the name M is the name which is provided with the unique destination identifier in the transaction information which is received. In some examples, $\Omega$ may be limited only to names of a given length or of a certain subset of characters, or the like. Otherwise, it will be appreciated that the list of possible names which could be assigned to M is not particularly limited.

In the example of FIG. 2, relating to an electronic payment between nodes in a payments network, the unique destination identifier $\alpha$ could correspond to the account number of the destination account, the account number and sort code of the destination account, or the like. In other forms of electronic transactions, the unique destination identifier could be any form of identifier which can uniquely identify the intended destination of the transaction and is not particularly limited in this regard. Nevertheless, it will be appreciated that the destination of the transactions is determined by the precise form of the unique destination identifier, and therefore any mistake or inconsistency in this destination identifier will result in the transaction being misdirected.

Furthermore, in the example of FIG. 2, the name M which is provided in the transaction information is the name provided by user 200 relating to the name by which user 200 identifies user 204. That is, in this example, the name M represents the name which has been provided by the payment sender, representing the name of the person to whom user 200 is intending to make the electronic payment. However, as described above, it will be appreciated that it is the unique destination identifier $\alpha$ which is used to determine the destination of the transaction, while the destination name M is used in accordance with embodiments of the disclosure for the purposes of destination verification.

Of course, additional information may be included in the received transaction information depending on the context of the situation, and embodiments of the disclosure are not particularly limited in this regard. For example, in the case of an electronic payment, additional information included in the transaction information could correspond to payment information, such as the value of the transaction, or the like. Alternatively, in other forms of electronic transactions, the additional information could, for example, relate to a message, photo, video or link provided with the transaction.

Once the transaction information has been received, the method proceeds to step S304.

In step S304, the method comprises obtaining from a storage unit a set of names used in previous transactions to that destination account. That is, in contrast to the single destination name M which is received in the transaction information, the set of names obtained from the storage unit in step S304 comprises the names used in previous transactions directed to that destination account:

$$N_\alpha = [n_1^\alpha, n_2^\alpha, \ldots n_t^\alpha]^T$$

where $N_\alpha$ is the set of names used in previous transactions to the account having unique identifier $\alpha$ and where $N_\alpha$ is a set of t unique names $n_t^\alpha$ used in those previous transactions to the account having that unique identifier $\alpha$. It will be appreciated that the manner by which the set of previous names is retrieved from the storage unit is not particularly limited. However, according to embodiments of the disclosure the set of names used in previous transactions $N_\alpha$ could be retrieved from the storage unit in accordance with the unique destination identifier $\alpha$ which has been received. For example, the set of names used in previous transactions could be retrieved by virtue of a lookup of names associated with a in the storage unit.

It will be appreciated that the set of names used in previous transactions $N_\alpha$ need not correspond to previous transactions made by the person from which the transaction information has been received (the initiator of the transaction). Rather, the set of previous names is a collection of names used by all payment senders to the account identified by the unique destination account $\alpha$. Referring to FIG. 2, for example, consider the case of a transaction from user 200. In the transaction information, user 200 provides a unique destination identifier $\alpha$ which identifies the account belonging to user 202. Accordingly, in step S304, the set of names used in all previous transactions $N_\alpha$ to user 204 is obtained from the storage unit, regardless of whether those transactions originated from the account belonging to user 200 or not. That is, in this example, names used by user 204 in transactions to user 202 and names used by user 200 to user 202 will be included in the set of names obtained from the storage unit.

Furthermore, the method of building the set of names used in previous transactions according to embodiments of the disclosure is not particularly limited, and depends upon the context of the situation to which the embodiments of the disclosure are applied. Such exemplary methods of building the set of names used in previous transactions are described in more detail below.

Once the set of names used in previous transactions $N_\alpha$ to that destination account has been obtained, the method proceeds to step S306.

In step S306, the method comprises determining at least one disparity value between the destination name and the set of names. That is, the method according to embodiments of the disclosure comprises determining the difference or disparity between the destination name M which is received with the transaction information and the set of names used in previous transactions $N_\alpha$ to the destination account identified by the unique destination identifier $\alpha$. The disparity between the destination name M and the set of names used in previous transactions $N_\alpha$ can be determined by a set of functions F of length s:

$$F = [f_1(M, N_\alpha), f_2(M, N_\alpha), \ldots f_s(M, N_\alpha)]^T$$

where $f_s(M, N_\alpha)$ is an individual function which is used to compare the input name M and the set of previous names $N_\alpha$ in order to determine the distance or disparity between the names. Of course, the method or functions used in order to determine the disparity in accordance with embodiments of the disclosure is not particularly limited. For example, provided that at least one function is used, the set of functions may be of any length as required. The distance, variation or disparity d between destination name M and each name $n_t^\alpha$ of the set of previous names $N_\alpha$ according to a function $f_s$ can therefore be described as:

$$d = f_s(M, n_t^\alpha)$$

such that the distance, variation or disparity matrix $D \in \mathbb{R}^{2s \times t}$ can be determined, and where:

$$D_{ij} = f_i(M, n_j^\alpha)$$

In other words, the i, $j^{th}$ element of the disparity matrix D is the value of the disparity between the destination name M and previous name $n_j^\alpha$ according to function $f_i$. In the case where the set of functions F is comprises a single function, and the set of previous names comprise a single name, then the disparity matrix D will comprise only a single disparity value.

As stated above, it will be appreciated that the method and functions of determining the at least one disparity value between the name M and the set of previous names $N_\alpha$ is not particularly limited, and any method or functions for determining the at least one disparity value can be used in accordance with embodiments of the disclosure. That is, the method and functions used for determining the disparity value will vary depending on the context of the situation to which the method of verifying the destination of a transaction according to embodiments of the disclosure are applied. Sources of variation between the names and exemplary functions which can be used in accordance with embodiments of the disclosure will be described in more detail below.

Once at least one disparity value between the destination name M and set of previous names $N_\alpha$ has been determined, the method proceeds to step S308.

In step S308, the method comprises producing a destination verification value based on the at least one disparity value, wherein the destination verification value is used to verify whether the transaction between nodes should proceed.

Consider an example with reference to FIG. 2 described above, where user 200 has initiated a transaction request by providing financial institution 206 with a unique destination identifier α and a destination name M. In this case, financial institution has determined a disparity matrix D representing the variation between the destination name M user 200 has provided and the set of previous names $N_\alpha$ used in previous transactions associated with that unique destination identifier α. According to embodiments of the disclosure, in order to verify the destination of the transaction and thus determine whether the transaction initiated by user 200 should proceed, it is first necessary for financial institution 206 to produce a destination verification value based upon the disparity matrix D which has been determined.

It will be appreciated that the method for producing the transaction verification value based on the at least one disparity value is not particularly limited, and will depend on the situation to which the method according to embodiments of the disclosure is being applied, and upon the shape of the disparity matrix D which has been determined. For example, an exemplary method which could be applied in accordance with embodiments of the disclosure would be to determine the average of all the disparity values contained in the matrix D and subsequently compare this average value against a target value for the transaction. Of course, the method of determining the destination verification value from the disparity between the destination name M and set of names used in previous transactions $N_\alpha$ in accordance with embodiments of the disclosure is not particularly limited in this regard. Methods for the determination of the destination verification value are described in more detail below.

Accordingly, the method of destination verification according to the present disclosure enables misdirected transactions to be identified before they are processed, thus reducing the likelihood of misdirected transactions being completed.

It will be appreciated that the method of destination verification according to the present disclosure enables any disparity between the destination account identifier α and the destination name M provided by the initiator of the transaction to be determined by virtue of the comparison between the destination name M and the set of previous transactions $N_\alpha$ associated with that identifier α. Such disparity may arise by virtue of a genuine mistake made by the user when providing the transaction information. For example, in the case of an electronic payment as described with reference to FIG. 2, user 200 may make a mistake when typing the account number and sort code of user 202. However, since the name provided with the transaction information by user 200 would then be compared against the set of names used not for the intended recipient, but rather with the set of names used for the mistakenly entered destination identifier, then, according to embodiments of the disclosure, the mistake can be detected and the misdirected transaction can be averted.

Alternatively, the disparity may arise by virtue of a fraudulent attempt to misdirect the transaction, whereby user 200 is provided with an account number and sort code he or she thinks is associated with an account owned by user 202, but is rather associated with an account number and sort code of an account owned by user 204. Again, since the name provided with the transaction information by user 200 would then be compared against the set of names used not for user 202 but rather for user 204, then the disparity between the name provided by user 200 and the set of previous names obtained using the unique destination identifier can be determined. Accordingly, the fraudulently misdirected electronic transaction can be averted.

Furthermore, it will be appreciated that since the set of names used in previous transactions can be obtained by virtue of a single lookup in the storage unit, as described above, then the method of destination verification according to embodiments of the disclosure can be performed quickly and substantially in real time as the transaction information, or transaction requests, are received. In an economy such as the UK, the number of transactions between accounts could reach a rate of around 300 transactions per second. As such, the method of destination verification according to embodiments of the disclosure enables the reduction of misdirected and fraudulent transactions while preserving consumer convenience. Moreover, since the method of destination verification according to embodiments of the disclosure is performed by comparing the set of names used in previous transactions to an account without requiring any record or identification of the account details from which those transactions to that account were made, the method of destination verification can be performed while preserving the privacy of consumers.

It will be appreciated that while the method according to embodiments of the disclosure has been described with reference to electronic payments between accounts, the present embodiment is not intended to be limited in this regard. That is, the method according to embodiments of the disclosure can be applied to any form of electronic transaction between nodes, where a unique destination identifier and a destination name are provided.

Furthermore, the method according to embodiments of the disclosure may be performed on an apparatus (or alternatively a server) as described with reference to FIG. 1. As previously stated, this apparatus 100 is controlled using a microprocessor or other processing circuitry 110. The apparatus 100 is connected to the network and is able to receive transaction information from each node of the network. For each transaction request which is received, the apparatus 100 performs the method steps S300 to S310 according to the present embodiment in order that the destination of a transaction between nodes in a network can be verified substantially in real time, resulting in a reduction in the number of misdirected electronic transactions which occur.

Exemplary Sources of Variation in Destination Names:

Embodiments of the present disclosure comprise determining the level of disparity between the name which is received in transaction information, and a set of names used in previous transactions to the destination identified by the unique destination identifier received in that transaction information. Evidently however, there are sources of variation in names which may commonly appear between the destination name received in the transaction information and the set of names used in previous transactions, either being frequently made by mistake or being legitimate alternatives to a name which has been provided. Such variations in destination names may appear in the set of previous names which are stored in the storage unit and/or in the destination name which has been provided with a transaction in a verification request.

Accordingly, embodiments of the disclosure may take an ensemble of approaches to determining the disparity between the destination name provided in the transaction information and the set of names used in previous transactions such that misdirected transactions can be identified while ensuring that legitimate transactions, being transactions with only a minor variation in the destination name, are not unduly restricted.

Sources of variation may occur where the account names are not provided in the order in which they have previously been supplied. Consider an account name, 'John Smith'. When requesting a transaction, a user may, naturally, supply the destination name as 'Smith John'. Alternatively, a user may be known by a number of partial names, nicknames or aliases, and a number of users may provide these partial names, nicknames or aliases as the destination name in the transaction information. Furthermore, it may be that an account is jointly held by a number of users, and therefore a number of distinct names may be associated with an account. Other sources of variation between the name which is provided and the set of previous names could occur owing to spelling variations or typos, such as misplaced letters, or the like. These exemplary sources of variation represent common sources of variation which may legitimately occur in names, but it will be appreciated that other sources of variation may be considered.

Different methods and functions for determining the disparity between a name received in the transaction information and the set of names used in previous transactions will provide different disparity values in accordance with the type and source of the variation between the names. For example, an absolute match function which determines the minimum number of modifications required to transform one name to another may provide a higher disparity value than an initials match comparison function or a partial match comparison function depending on the circumstances. Other functions, such as a N-gram comparison function or phonetics based comparison function, may be applied in accordance with the context of the situation in which embodiments of the disclosure are applied.

Alternatively or in addition, it will be appreciated that a phonetics based disparity or distance function may be more appropriate in a situation whereby the expected phonetic variation is large, such as for Chinese names, than a disparity value determined by virtue of a Hamming distance or a Damerau-Levenshtein disparity function, for example.

Applying a number of different functions in the set of functions which are to be used to determine the disparity between the name which is received in the transaction information and the set of names used in previous transactions may further improve the determination of the disparity score by ensuring that a large number of sources of variation are taken into consideration. That is each function influences the disparity value which is determined such that legitimate variations between the received name and the set of names used in previous transactions can be accommodated. In this manner, the method of destination verification according to embodiments of the disclosure can be further enhanced.

In other words, it will be appreciated that the various methods and functions which can be applied in order to determine the disparity between the destination name received and the set of previous names have their own strengths and weaknesses which may be exploited depending of the context of the situation in which embodiments of the disclosure is applied.

Whilst exemplary sources of variation in destination names, and corresponding methods and functions for determining this variation, have been described above, it will be appreciated that the embodiments of the disclosure are not particularly limited in this regard. For example, the weights for respective functions of the set of functions used to determine the disparity value can be chosen based on the expected utility for the data or can, alternatively, be learned from the data itself. Any such method for determining at least one disparity value between the destination name and the set of names used in previous transactions can be used in accordance with the present disclosure.

Weighting of Disparity Values:

Consider an example of an electronic payment made between nodes in a network, such as that described with reference to FIG. 2. As described above, there may be a number of types of variation in account names which may be provided by a user, and the method for determining the disparity between an account name provided by the user and the set of names used in previous transactions must vary accordingly. Furthermore it may be that, depending on the specific situation, certain methods for determining the disparity are more applicable, or should be given greater credence, depending on the context of the situation in which the method is applied.

Figure 4:
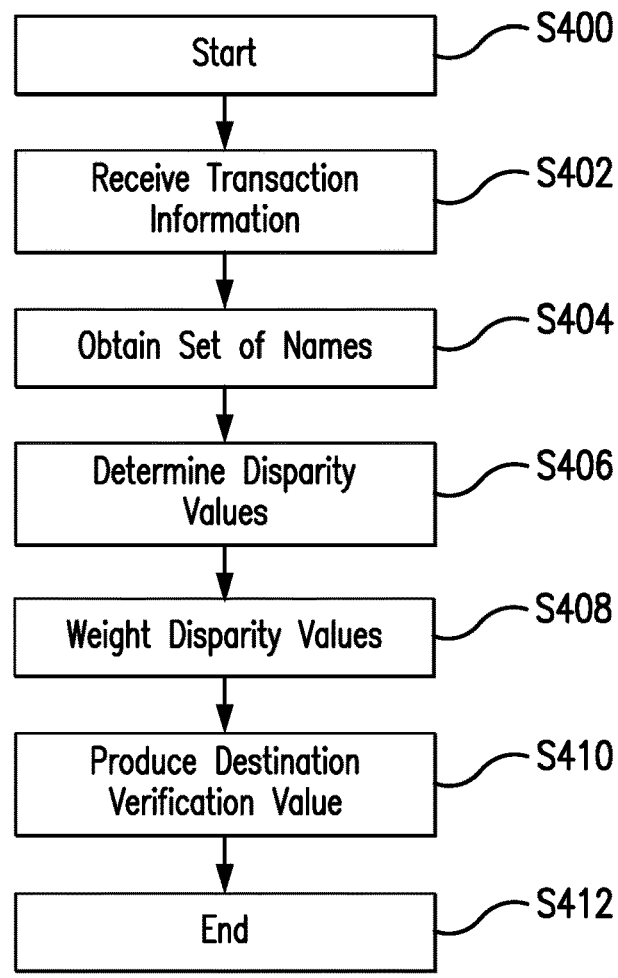
FIG. 4 illustrates a method of verifying the destination of a transaction according to embodiments of the disclosure.

FIG. 4 illustrates a method of verifying the destination of a transaction between nodes in a network according to embodiments of the disclosure. The method of FIG. 4 starts with step S400 and ends with step S412. Steps S402 to S406 are the same as Steps S302 to S306 described above with reference to FIG. 3. As such, for brevity, these steps will not be described in detail again at this stage. However, once the disparity value has been determined in Step S406, the method proceeds to step S408.

Step S408 comprises applying a first set of weighting factors to the disparity values when a plurality of disparity values are determined. The weighting factor which is applied in accordance with embodiments of the disclosure is not particularly limited and, as described above, may depend on the situation and context of the situation to which the method of the present disclosure is being applied. The method step S408 is described in detail below, with reference to the example illustrated in FIGS. 2 and 3.

Consider the example, as described above with reference to FIG. 3, whereby the disparity matrix D representing the disparity between the received destination name M and set of names used in previous transactions $N_\alpha$ has been determined in accordance with a set of functions F of length s. According to embodiments of the disclosure, a weighting matrix $W \in \mathbb{R}^{2s}$ may be applied to the disparity matrix D, where:

$$\sum_{i=1}^{2s} w_i = 1$$

That is, $w_i$ is the individual weighting factor which is to be applied to each of the values in the disparity matrix D in accordance with the individual function $f$ of the set of functions F which has been used to determine the corresponding disparity value in the disparity matrix D. By applying the weighting factor W to the set of disparity values which have been determined, and by varying the individual weighing factors $w_i$, it is possible to vary the relative strength, weighting or importance of each of the functions used to determine the disparity between the name M and the set of previous names $N_\alpha$. It will be appreciated that when equal values of $w_i$ are applied then equal relative importance is given to the individual disparity values in D. That is, in this case, all the individual values in the disparity matrix D provide the same level of influence in the subsequent determination of the destination verification value in accordance with embodiments of the disclosure.

Once the method of weighting the disparity values according to step S408 has been completed, the method proceeds to step S410 in order to produce the destination verification value. It will be appreciated that Step S410 is the same as step S308 with reference to FIG. 3 above.

Consider the exemplary situation depicted in FIG. 2. In this exemplary situation, user 200 wishes to send an electronic payment to user 202, and thus provides the unique destination identifier α corresponding to the account owned by user 202 in the transaction information. User 200 also provides the first name and surname (or family name) of user 202, but provides those names in a different order than they have been used in previous transactions.

In this exemplary situation, the disparity value returned by an absolute match may be high (since the names are provided in a different order than they have been used in previous transactions). The disparity value returned by a function which is less sensitive to the order of the names will return a low disparity value. In this exemplary situation, a weighting factor which places high relative importance to the absolute match function may thus result in the transaction being aborted in accordance with step S410. However, in contrast, a weighting factor which places low relative importance to the absolute match function but higher importance to a function which is less sensitive to the exact order of the names may result in the transaction destination being verified, and the transaction proceeding in accordance with step S410.

The set of weighting factors W which are applied could correspond to a predetermined weighting matrix which is applied equally to all transactions. Alternatively, in embodiments of the disclosure, the set of weighting factors which are applied to the plurality of disparity values are determined in accordance with the received transaction information.

For example, according to embodiments of the disclosure, the weighting factor which is applied could be determined in accordance with the language of the transaction information. In certain languages, for examples, phonetic variations are indicative of a greater disparity between the received name M and set of previous names $N_\alpha$ than the level of disparity such a phonetic variation would be indicative of in other languages. As such, the weighting factors could be dynamically adapted in accordance with the language of the transaction information in order to take account of the level of importance of phonetic variation between the names.

Of course the present disclosure is not limited specifically to dynamically adapting the weighing factors in accordance with the language of the transaction information. Rather, the weighting could be dynamically adapted in response to any of the information received with the transaction information including the type of transaction, whether a transaction between those parties has been made before, the frequency of the transaction, the value of the transaction, the importance of the transaction, or the like.

Verifying the destination of a transaction between nodes in a network in this manner, whereby a set of weighting factors are applied to the disparity values when a plurality of disparity values are determined, provides a robust mechanism for verifying the destination of a transaction thus further reducing the number of misdirected transactions. Moreover, dynamically adapting the weighting factors in accordance with the transaction information ensures that the method applied is sensitive to the given situation is applied thus increasing the strength of the computation of the disparity value, thus improving the method of destination verification in accordance with embodiments of the disclosure.

Weighting of Set of Names Used in Previous Transactions:

As described above with reference to FIG. 3, the method of verifying the transaction destination according to embodiments comprises a determination of the disparity value between the name which is provided in the transaction information and the set of names used in previous transactions associated with the unique destination identifier provided in the transaction information. Moreover as described above, according to embodiments of the disclosure, the method may further comprise applying a first set of weighting factors to the disparity values when a plurality of disparity values are determined.

Alternatively or in addition, embodiments of the disclosure may further comprise applying a second set of weighting factors to the set of names used in previous transactions. That is, in the method described with reference to FIG. 3, the set of names used in previous transactions had equal value in the determination of the disparity value and, subsequently, the determination of the destination verification value. However, according to embodiments of the disclosure, a weighting factor may be applied to the set of names used in previous transactions such that certain names have an increased level of importance or impact upon the determination of the disparity values and the destination verification value. The second set of weighting factors may, in accordance with embodiments of the disclosure, be determined in accordance with the information regarding the transaction in which each name of the set of previous names was used.

FIG. 5 depicts a set of names 500 which have been used in previous transactions associated with an account in accordance with embodiments of the disclosure. In this exemplary set of names, column 502 represents the name which has been used in the previous transactions to that destination; column 504 represents the number of instances or occurrences of the use of the name in previous transactions; column 506 represents the time when that name was most recently used in previous transactions; column 508 represents the value of the transaction associated with that name and column 510 represents whether the transaction had been flagged as a transaction of particular importance. It will be appreciated that these factors represent an exemplary selection of the factors which may be stored in association with the set of names used in previous transactions, and other factors may be stored in accordance with the particular situation in which embodiments of the disclosure are applied. The method of producing the set of previous names will be described in greater detail below.

While in this exemplary situation a single entry is created for each name which has been used in previous transactions, with column 504 representing the number of transactions in which that name has been used, it will be appreciated that, alternatively, a new row or entry in the table could be created for each use of the name. In this case, the number of times the name has been used in previous transactions could be determined from counting the instances of the use of that name in the name column 502.

Furthermore, while the value of the transactions stored in column 508 could be a cumulative value of all previous transactions which have used that name, or could be a set comprising the individual value of the transaction used in accordance with each instance of the use of that name.

As such, in accordance with embodiments of the disclosure, a set of weighting factors can be applied to the set of previous names used in previous transactions in accordance with the received transaction information or information regarding the transaction in which each name of the set of previous names was used (such as the exemplary information depicted with reference to FIG. 5). Determination of the disparity value in this manner further improves the method of destination of verification.

According to embodiments of the disclosure, the set of weighing factors applied to the set of names used in previous transactions is determined in accordance with a value associated with previous transactions using each name of the set of previous names. For example, a greater importance or weighting factor can be applied to names used in association with transactions having a higher transaction value, owing to the greater level of caution which will have been applied by a user when supplying transaction information corresponding to high value transactions.

In other words, weighting the set of names used in previous transactions in accordance with the value associated with previous transactions using each name of the set of previous names in accordance with embodiments of the disclosure ensures that variation between the supplied name and the set of names used in previous low value transactions has a lesser degree of influence or impact on the overall disparity value determined than variation between the supplied name and the set of names used in previous high value transactions. Accordingly the disparity value, and the subsequent destination verification value, which is determined in accordance with embodiments of the disclosure is less sensitive to names in the set of previous names which are determined to be less reliable, and thus the method of destination verification according to embodiments of the disclosure can be further improved.

Furthermore, the value of the transaction is also indicative of the likelihood of the transaction to be part of a distribution of funds by virtue fraudulent transactions through a payments network. That is, a fraudster will typically transfer funds through numerous other bank accounts at high speed in a number of small transactions. This is done to make it difficult to trace the movement of funds originating from the initial fraudulent transaction across the banking network. As such, higher value transactions are less likely to be part of money laundering transactions, and the weighting applied to such transactions should be increased accordingly.

As described above, the value of the transactions can be based upon the individual value of the transaction used with each instance of the name, or alternatively, could be based upon a cumulative value of all the instances of the name in previous transactions. In this case, a higher weighting factor is applied to names used in previous transactions with a higher cumulative value.

Furthermore, according to embodiments of the disclosure, a higher weighting factor may be applied to names used in previous transactions where individual transaction using that name have a value over a predetermined threshold. In other words, use of the name in low value, and thus less unreliable transactions, may be discarded from the determination of the destination verification value. As such, only use of the names in high value transaction, these being transactions over the threshold value, will be used in the determination of the disparity between the name received in the transaction information and the set of names used in previous transactions.

Alternatively or in addition, the second set of weighting factors, being the weighting factors applied to the set of previous names, may be determined in accordance with the number of previous transactions using that name. For example, the higher the occurrence of that name in the set of names used in previous transactions, the more reliable that name is likely to be when verifying the destination of the transaction in accordance with embodiments of the disclosure. In contrast, a name which has only a single occurrence in the set of names used in previous transactions is more likely to be an erroneous use of the name and thus a lesser degree of importance should be given to that name in the determination of the destination verification value in accordance with embodiments of the disclosure. It will be appreciated that the number of uses of the name may be determined as a proportion or percentage of the total names used in previous transactions. Alternatively, uses of the name below a threshold level may be discounted from the determination of the destination value, for example.

Consider the example, as described above with reference to FIG. 3, whereby the disparity matrix D representing the disparity between the received destination name M and set of names used in previous transactions $N_\alpha$ has been determined in accordance with a set of functions F of length s. According to embodiments of the disclosure, a weighting factor C representing the number of occurrences of the name and a weighting factor V representing the cumulative value of the transaction may be defined as:

$$C_\alpha \in \mathbb{R}_+{}^t, \text{ where } \Sigma_{j=1}{}^t c_j{}^\alpha = 1$$

$$V_\alpha \in \mathbb{R}_+{}^t, \text{ where } \Sigma_{j=1}{}^t v_j{}^\alpha = 1$$

such that the sum of the individual weighting factors $c_j{}^\alpha$ and $v_j{}^\alpha$ applied to each instance of the name across the full set of previous names is normalized to 1. Accordingly, once the weighting factor $V_\alpha$ and $C_\alpha$ have been determined then they can be applied either directly to the set of previous names, or they can be applied to the disparity matrix, such that:

$$D' = \begin{bmatrix} DC_\alpha \\ DV_\alpha \end{bmatrix}$$

where D' is the disparity matrix representing the disparity between the name received in the transaction information and the set of names used in accordance with previous transactions weighted in accordance with the number of occurrences of the name and the cumulative value of the transactions in accordance with embodiments of the disclosure.

It will be appreciated that the mechanisms and factors by which the set of names used in previous transactions is weighted is not particularly limited in accordance with the present disclosure. That is, as described above, the second set of weighting factors may, in accordance with embodiments of the disclosure, be determined in accordance with the information regarding the transaction in which each name of the set of previous names was used in accordance with embodiments of the disclosure depending on the context of the situation in which the embodiments of the disclosure are applied.

Applying the weighting factors to the set of names used in previous transactions in accordance with embodiments of the disclosure provides more relevant distance scores between the name received in the transaction information and the set of names used in previous transactions, thus further improving the accuracy and reliability of the method of destination verification.

Threshold Value:

As described above with reference to FIG. 3 the disparity value determined in Step S306 is subsequently used in order to determine a destination verification value, the destination verification value being used to verify whether the transactions between nodes should proceed. According to embodiments of the disclosure, the method may further comprise determining that the transaction should proceed when the destination verification value is below a threshold value.

That is, for example, when the destination verification value has been determined in accordance with embodiments of the disclosure, a comparison can be made between the destination verification value and a target, or threshold value. In embodiments of the disclosure, if the transaction destination value is above this threshold value, then it can be determined that the difference or disparity between the name received with the transaction information and the set of names used in previous transactions is greater than a certain factor. In this manner, the threshold value indicates an acceptable or allowable level of variation between the name which is supplied and the set of names used in previous transactions. A destination verification value below the threshold value indicates that the similarity between the name which has been received with the transaction information and the set of previous names is allowable. In contrast, a destination verification value above this threshold value indicates that the destination cannot be verified because the disparity between the name received with the transaction information and the previous set of names is too great.

For example, in a case whereby a disparity value has been determined and whereby a weighting factor has been applied to both the set of functions used to determine that weighting factor and the set of names used in association with that destination account in accordance with embodiments of the disclosure, then the destination verification value p can be determined:

$$\rho = W^T D', \text{ where } \rho \in [0,1]$$

That is, the destination verification value p produced in accordance with embodiments of the disclosure is a normalized value between 0 and 1. However, it will be appreciated that the value of $W^T$ applied to the disparity between the destination name and the set of names used in previous transactions weighted by the value of the transaction, $DC_\alpha$, need not be the same as the value of $W^T$ applied to the disparity between the destination names and the set of names used in previous transactions weighted by the volume or number of transactions $DV_\alpha$. Of course, as described above, any suitable method of determining the destination verification value from the disparity between the destination name received in the transaction information and the set of names used in previous transactions may be used in accordance with embodiments of the disclosure.

As described above, the actions taken in response to a determination that the destination verification value is above a threshold limit are not particularly limited. For example, in certain embodiments, the method may comprise aborting the transaction if it is determined that the intended destination cannot be verified (owing to the destination verification value being above a certain limit). Alternatively, or in addition, the method according to embodiments of the disclosure may comprise providing a notification regarding the transaction information when it is determined that transaction information is above the threshold limit. That is, such a notification may be a warning message to the transaction initiator, or the body processing the transaction, that the transaction destination cannot be verified. In the exemplary situation of FIG. 2, such notification could be provided to the user 200 and/or the financial institution 206, for example.

Further alternatively, or in addition, the method according to embodiments of the disclosure may comprise staying or pausing the transaction until additional conformation of the transaction is provided when the transaction verification value is above the threshold limit. For example, when it is determined that the disparity between the name received in the transaction information and the set of previous names is too great (being above a threshold limit) then the transaction can be halted, and a request for additional information or conformation of the transaction can be made to the initiator of the transaction. Consider the exemplary situation depicted in FIG. 2. If user 200 attempts to send an electronic payment to user 202 (identified by the unique destination identifier) but it is subsequently determined that the disparity between the name user 200 provides with the transaction information and the set of previous names used in transactions associated with user 202 is too large, then the method according to embodiments of the disclosure could further comprise requesting user 200 to provide additional conformation that the electronic payment is indeed intended for user 202. Only if user 200 provides conformation of this intention will the transaction proceed. Otherwise, after a default time, for example, the transaction between user 200 and user 202 will be aborted.

Of course, the method for requesting additional conformation and/or additional information in accordance with embodiments of the disclosure is not particularly limited, and can vary in accordance with the context of the situation in which the embodiments of the disclosure are applied.

According to embodiments of the disclosure, the method may further comprise setting the threshold value in accordance with the received transaction information. In other words, since the threshold value indicates a degree of similarity or disparity between the name which has been received with the transaction information and the set of names used in previous transactions, adapting the threshold value in accordance with the received transaction information provides a mechanism for adapting the level of variation between the name received in the transaction information and the set of names used in previous transactions which will be deemed to be allowable in accordance with the context of the situation to which embodiments of the disclosure are applied.

Consider the exemplary situation described with reference to FIG. 2. In this exemplary situation, the method according to embodiments of the disclosure may comprise determining the threshold level in accordance with the value of the transaction between users in the payments network. For example, if user 200 attempts to send a high value transaction to user 202, then it may be determined that the threshold level of acceptable variation between the name provided by user 200 in the transaction information and the set of previous names used in association with the account of user 202 should be very low. That is, owing to the high value of the transaction, and the severity of the consequences of the transaction being misdirected, the threshold level of acceptable variation may be set very low.

In contrast, if user 200 attempts to send a low value transaction to user 202, then it may be determined that the threshold level of acceptable variation between the name provided by user 200 and the set of names used in previous transactions associated with the account of user 202 should be higher. That is, owing to the low value of the transaction, it may be determined that the consequences of a misdirected transaction are less severe. Furthermore, if the sensitivity of the method of transaction destination verification is set too low, then a large number of legitimate transactions may be aborted or delayed pending additional conformation depending on the situation. Accordingly, the threshold level of acceptable variation between the name provided by user 200 in the transaction information and the set of names used in previous transactions in association with the account of user 202 may be higher.

It will be appreciated that the above method of varying the threshold level in accordance with the value of the transaction may be applied to any such information provided with or contained in the transaction information, and is not limited to the specific example of the value of the transaction as described above with reference to FIG. 2. For example, the threshold level of the transaction may also be set in accordance with the type of transaction, whether a transaction between those parties has been made before, the frequency of the transaction, the value of the transaction, the importance of the transaction, or the like.

By dynamically adjusting the threshold level of acceptable variation between the name provided with the transaction information and the set of names used in previous transactions to that destination account in order to verify the transaction destination in accordance with embodiments of the disclosure, and the efficiency of destination verification can be further improved.

Figure 6:
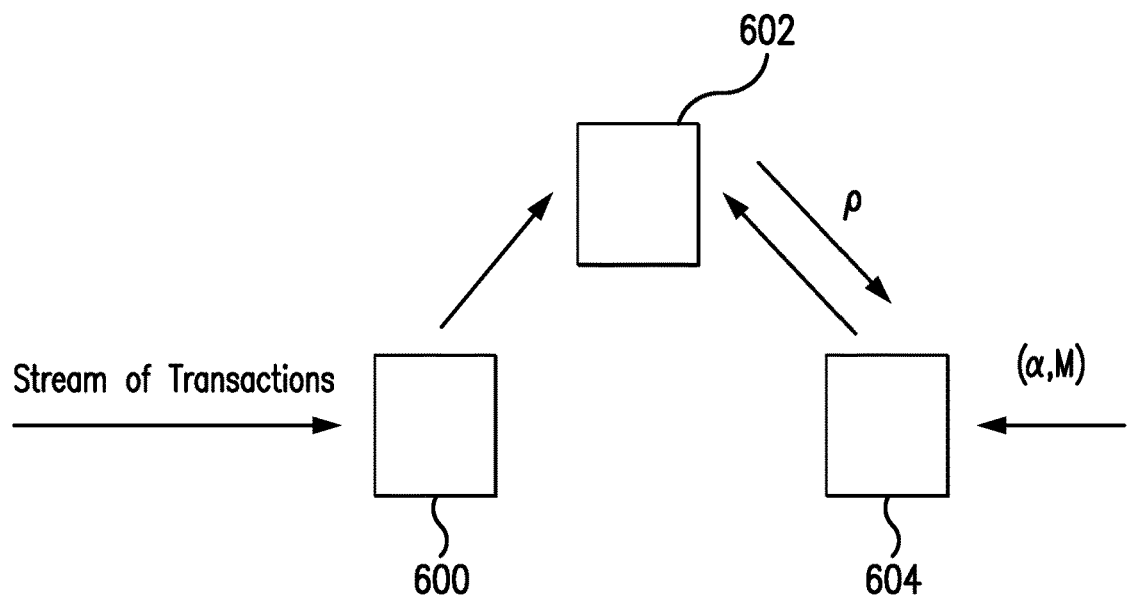
FIG. 6 illustrates a method of building a set of previous names in accordance with embodiments of the disclosure.

Building a Set of Previous Names:

FIG. 6 illustrates a method of building a set of previous names in accordance with embodiments of the disclosure. A stream of transactions between nodes in a payment network are received by receiving circuitry 600. As described above, in an economy such as the UK, the stream of transactions through the network may reach a rate of around 300 transactions per second. 602 is a storage unit storing the set of names used in accordance with previous transactions. In this exemplary situation, any transaction which is received by 600 is stored in the storage unit 602. In this exemplary situation, the method of account name verification is performed once an account name verification request is received at receiving circuitry 604. The information which is stored with the destination name in accordance with embodiments of the disclosure is not particularly limited, as described above with reference to FIG. 5.

In other words, a set of names used in previous transactions is produced as the stream of transactions is consumed. Then, once a transactions verification request, comprising a unique account identifier and a destination name, is received by 604, this set of previous names is used in accordance with embodiments of the disclosure in order to produce a transaction verification value. The transaction verification value can then be used in order to determine whether the transaction between nodes should proceed. Accordingly, the set of previous names is produced as the stream of transactions is consumed, and the production of the destination verification value, in accordance with embodiments of the disclosure, occurs in response to a destination verification request.

Alternatively to the above described exemplary application, the method may, according to embodiments of the disclosure, comprise adding a transaction name supplied in a transaction to the set of previous names which are associated with that account only once the transaction destination itself has been verified. In other words, only the names associated with verified transactions will be included in the set of names used in previous transactions associated with an account.

In the example of transactions between accounts in a payments network, when an account is initially opened there will be no previous names associated with that account. However, the user may be required to provide an account name, or list of names with which they wish to be associated, thus building an initial set of names. For example, a user may supply their first name, surname and nickname as names associated with that account as an initial set of names. Accordingly, when a transaction is first directed towards that account, the disparity between the supplied name and this initial set of names will be determined. If it is considered that the disparity between the supplied name and this initial set of previous names is low, either because the supplied name matches one of the initial names or because it varies from one of those initial names in a way or ways which are immaterial as described above, then the transaction destination will be verified and that transaction will be allowed to proceed.

Furthermore, according to embodiments of the disclosure, once that transaction destination has been verified, the transaction name supplied in that transaction will be added to the set of previous names which are associated with that account. That is, if the destination cannot be verified, then that name is not included in the set of names used in previous transactions.

Furthermore, in certain situations the name with which a user wishes to be known may change over time. For example, a person's nickname may change over time, or a person may wish to change their name in response to certain life events, such as getting married. According to embodiments of the disclosure, it is therefore possible for a user to supply a new name, which has not yet been used in any previous transactions, but should nevertheless be added to the set of names with which a supplied name is compared for destination verification according to the present embodiment. In this manner, even if the user wishes to change their name, the method of verifying the destination of transactions according to the present embodiment can still be applied. Furthermore, once other users begin making transactions to the account under this new name the set of previous names, and associated weighting applied, will continue to adapt over time towards the new name. Alternatively or in addition, an initial bonus weighting factor may be applied to the new names which a user supplies.

Of course, it will be appreciated that the method by which the set of previous names is constructed in accordance with embodiments of the disclosure is not particularly limited and depends on the context of the situation to which the embodiments of the disclosure are applied.

Additional Modifications of the Embodiment

As described above, it will be appreciated that while the method according to embodiments of the disclosure has been described with reference to electronic payments between accounts, the present embodiment is not intended to be limited in this regard. That is, embodiments of the disclosure can be applied to any type of financial transaction between bank accounts or financial institutions made by any method such as Faster Payments, BACS transfers, or the like. Furthermore, the method according to the present disclosure is not limited to electronic payment transactions. Rather, the method according to embodiments of the disclosure can be applied to verify the destination of any form of electronic transaction or message where the corresponding transaction or message information comprises a unique destination identifier and destination names as described above. For example, the method according to embodiments of the disclosure could be applied to destination verification of messages sent through a mobile communications network, or the like.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

Clauses:

In addition, further aspects of the disclosure are set out in the accompanying independent and dependent Clauses.

Clause 1: A method of verifying the destination of a transaction between nodes in a network, the method comprising: receiving transaction information corresponding to a transaction between the nodes, the transaction information comprising a unique destination identifier and a destination name, the unique destination identifier defining a destination account of the transaction; obtaining from a storage unit a set of names used in previous transactions to that destination account; determining at least one disparity value between the destination name and the set of names; and producing a destination verification value based on the at least one disparity value, wherein the destination verification value is used to verify whether the transaction between nodes should proceed.

Clause 2: The method according to Clause 1 may further include applying a first set of weighting factors to the disparity values when a plurality of disparity values are determined.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Clause 3: The method according to Clause 2, wherein the first set of weighting factors applied to the plurality of disparity values is determined in accordance with the received transaction information.

Clause 4: The method according to any of the preceding Clauses, wherein the at least one disparity value is determined in accordance with a least one of an absolute match comparison function, phonetics based comparison function, N-gram comparison function, initials match comparison function or partial match comparison function.

Clause 5: The method according to any of the preceding Clauses, wherein the method further comprises applying a second set of weighting factors to the set of names used in previous transactions.

Clause 6: The method according to Clause 5, wherein the second set of weighting factors applied to the set of names used in previous transactions is determined in accordance with a value associated with previous transactions using each name of the set of previous names.

Clause 7: The method according to Clause 6, wherein a higher weighting factor is applied to names used in previous transactions using a higher cumulative value.

Clause 8: The method according to Clause 6, wherein a higher weighting factor is applied to names used in previous transactions where individual transactions using that name have a value over a predetermined threshold value.

Clause 9: The method according to Clause 5, wherein the second set of weighting factors applied to the set of names in previous transactions is determined in accordance with the number of previous transactions using that name.

Clause 10: The method according to any of the preceding Clauses, wherein the method comprises determining that the transaction should proceed when the destination verification value is below a threshold value.

Clause 11: The method according to any of the preceding Clauses, wherein the method comprises staying the transaction until additional confirmation of the transaction is provided when the transaction verification value is below the threshold value.

Clause 12: The method according to Clause 10 or 11, wherein the method further comprises setting the threshold value in accordance with the received transaction information.

Clause 13: The method according to any of the preceding Clauses, wherein the method further comprises adding the destination name to the set of names used in previous transactions to that destination account stored in the storage unit when it is verified that the transaction between nodes should proceed.

Clause 14: An apparatus for verifying the destination of a transaction between nodes in a network, the apparatus comprising at least one processing circuitry configured to: receive transaction information corresponding to a transaction between the nodes, the transaction information comprising a unique destination identifier and a destination name, the unique destination identifier defining a destination account of the transaction; obtain from a storage unit a set of names used in previous transactions to that destination account; determine at least one disparity value between the destination name and the set of names; and produce a destination verification value based on the at least one disparity value, wherein the destination verification value is used to verify whether the transaction between nodes should proceed.

Clause 15: A computer program product comprising instructions which, when the program is executed by the computer, cause the computer to carry out a method of verifying the destination of a transaction between nodes in a network, the method comprising: receiving transaction information corresponding to a transaction between the nodes, the transaction information comprising a unique destination identifier and a destination name, the unique destination identifier defining a destination account of the transaction; obtaining from a storage unit a set of names used in previous transactions to that destination account; determining at least one disparity value between the destination name and the set of names; and producing a destination verification value based on the at least one disparity value, wherein the destination verification value is used to verify whether the transaction between nodes should proceed.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of verifying a destination of a transaction between nodes in a network, the method comprising, in substantially real time:

receiving transaction information corresponding to a transaction between the nodes, the transaction information comprising a unique destination identifier and a destination name, the unique destination identifier defining a destination account of the transaction;

obtaining from a storage unit a set of names from previous transactions to that destination account;

determining, by a computing device, multiple disparity values, each disparity value being between the destination name and one name of the set of names, the multiple disparity values based on a combination of two or more functions of: an absolute match comparison function, a phonetics-based comparison function, an N-gram comparison function, an initials match comparison function, and a partial match comparison function;

applying, by the computing device, a weighting factor of a first set of weighting factors to each disparity value based on a function of the two or more functions used to determine the disparity value;

producing, by the computing device, a destination verification value based on an average of the weighted disparity values, wherein the destination verification value is used to verify whether the transaction between nodes should proceed;

setting, by the computing device, a threshold value based on at least one of: an amount of the transaction, a type of the transaction, and prior transactions with the destination account; and aborting, by the computing device, the transaction in response to the destination verification value being below the threshold value, thereby indicating that the transaction between nodes should not proceed.

2. The method according to claim 1, wherein the first set of weighting factors is determined in accordance with a language of the transaction information.

3. The method according to claim 1, wherein the first set of weighting factors applied to the multiple disparity values is determined in accordance with the received transaction information.

4. The method according to claim 1, further comprising applying a second set of weighting factors to the set of names from the previous transactions.

5. The method according to claim 4, wherein the second set of weighting factors applied to the set of names from the previous transactions is determined in accordance with a value associated with previous transactions using each name of the set of previous names.

6. The method according to claim 5, wherein a higher weighting factor is applied to names from the previous transactions with a higher cumulative value.

7. The method according to claim 5, wherein a higher weighting factor is applied to names from the previous transactions where individual transactions using that name have a value over a predetermined threshold value.

8. The method according to claim 4, wherein the second set of weighting factors applied to the set of names from the previous transactions is determined in accordance with a number of the previous transactions using that name.

9. The method according to claim 1, further comprising adding the destination name to the set of names used in previous transactions to that destination account stored in the storage unit when it is verified that the transaction between nodes should proceed.

10. An apparatus for verifying a destination of a transaction between nodes in a network, the apparatus comprising at least one processing circuitry configured to, in substantially real time:

receive transaction information corresponding to a transaction between the nodes, the transaction information comprising a unique destination identifier and a destination name, the unique destination identifier defining a destination account of the transaction;

obtain from a storage unit a set of names used in previous transactions to that destination account;

determine multiple disparity values, each disparity value being between the destination name and one name of the set of names, the multiple disparity values based on a combination of two or more functions of: an absolute match comparison function, a phonetics-based comparison function, an N-gram comparison function, an initials match comparison function, and a partial match comparison function;

apply a weighting factor of a first set of weighting factors to each disparity value based on a function of the two or more functions used to determine the disparity value;

produce a destination verification value based on an average of the weighted disparity values, wherein the destination verification value is used to verify whether the transaction between nodes should proceed;

set a threshold value based on at least one of: an amount of the transaction, a type of the transaction, and prior transactions with the destination account; and abort the transaction in response to the destination verification value not satisfying the threshold value, thereby indicating that the transaction between nodes should not proceed.

11. The apparatus of claim 10, wherein the at least one processing circuitry is configured to, in response to the destination verification value not satisfying the threshold value, stay the transaction until additional confirmation of the transaction is provided.

12. A non-transitory computer readable storage medium including executable instructions for verifying a destination of a transaction between nodes in a network, which when executed by at least one processor, cause the at least one processor to, in substantially real time:

receive transaction information corresponding to a transaction between the nodes, the transaction information comprising a unique destination identifier and a destination name, the unique destination identifier defining a destination account of the transaction;

obtain from a storage unit a set of names used in previous transactions to that destination account;

determine multiple disparity values, each disparity value being between the destination name and one name of the set of names, the multiple disparity values based on a combination of two or more functions of: an absolute match comparison function, a phonetics-based comparison function, an N-gram comparison function, an initials match comparison function, and a partial match comparison function;

apply a weighting factor of a first set of weighting factors to each disparity value based on a function of the two or more functions used to determine the disparity value;

produce a destination verification value based on an average of the weighted disparity values, wherein the destination verification value is used to verify whether the transaction between nodes should proceed;

set a threshold value based on at least one of: an amount of the transaction, a type of the transaction, and prior transactions with the destination account; and abort the transaction in response to the destination verification value being below the threshold value, thereby indicating that the transaction between nodes should not proceed.

\* \* \* \* \*